June 9, 1959
L. E. LEE
2,889,754
MACHINE TOOL
Filed March 1, 1954
5 Sheets-Sheet 1
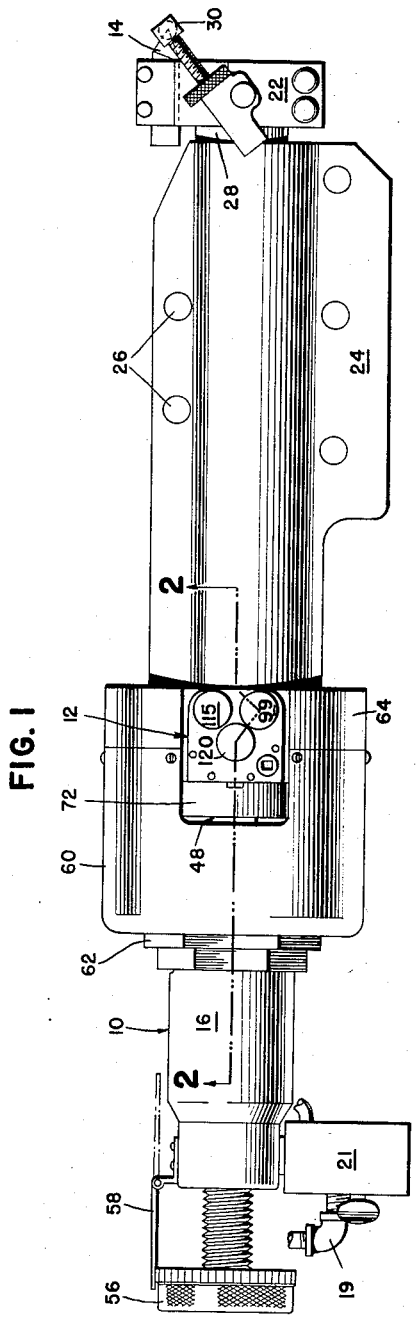
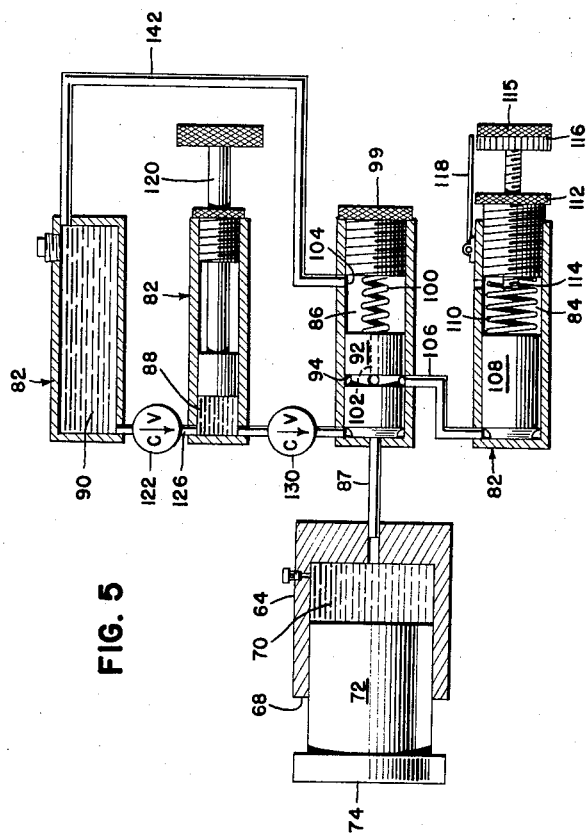
INVENTOR
LUTHER E. LEE
BY
*ATTORNEYS*

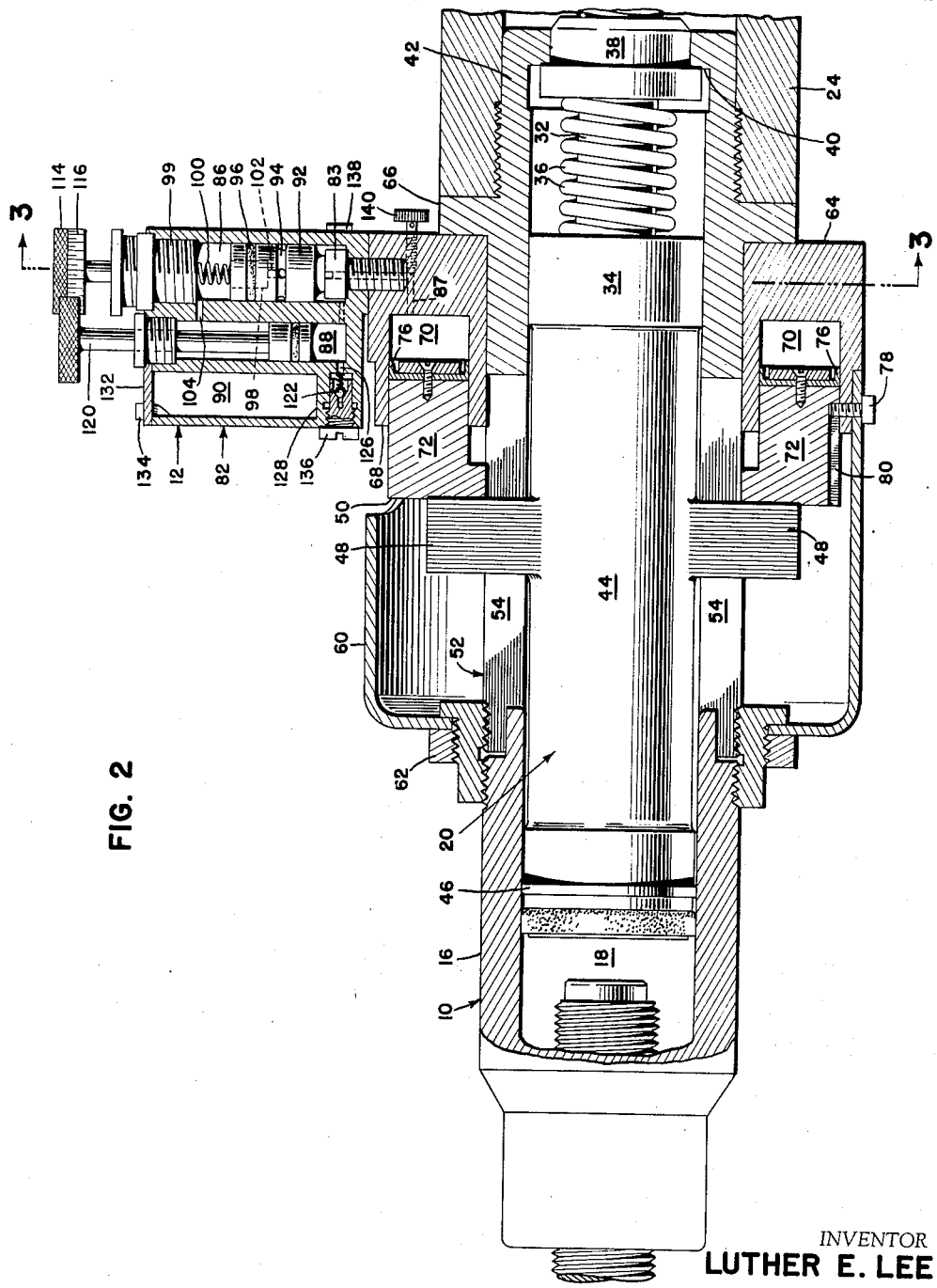

June 9, 1959
L. E. LEE
2,889,754
MACHINE TOOL
Filed March 1, 1954
5 Sheets-Sheet 3
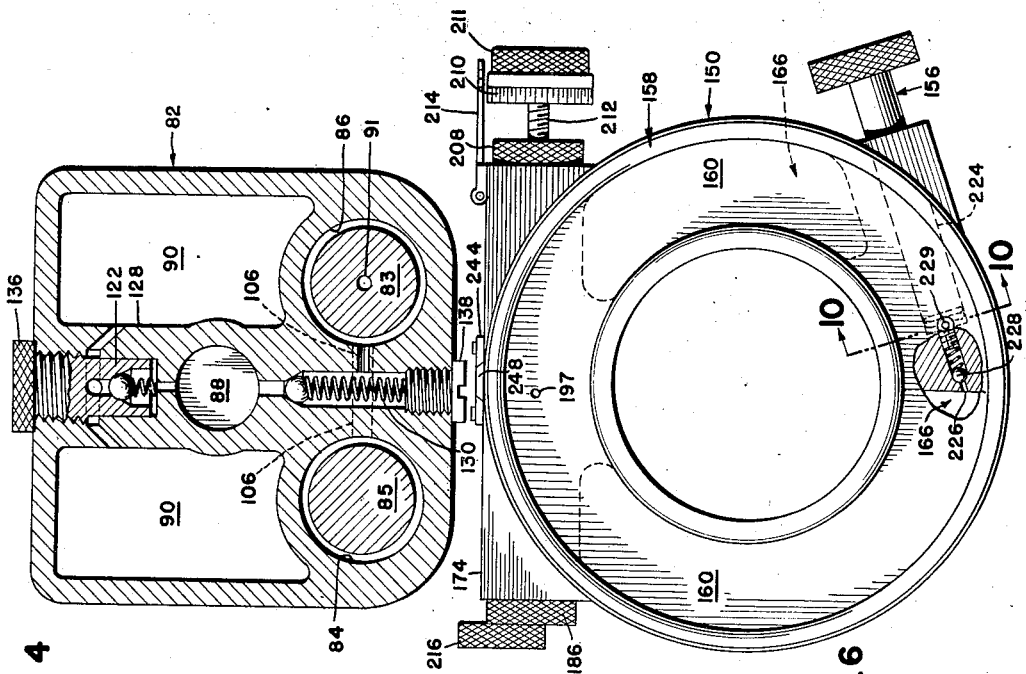
FIG. 4
FIG. 6
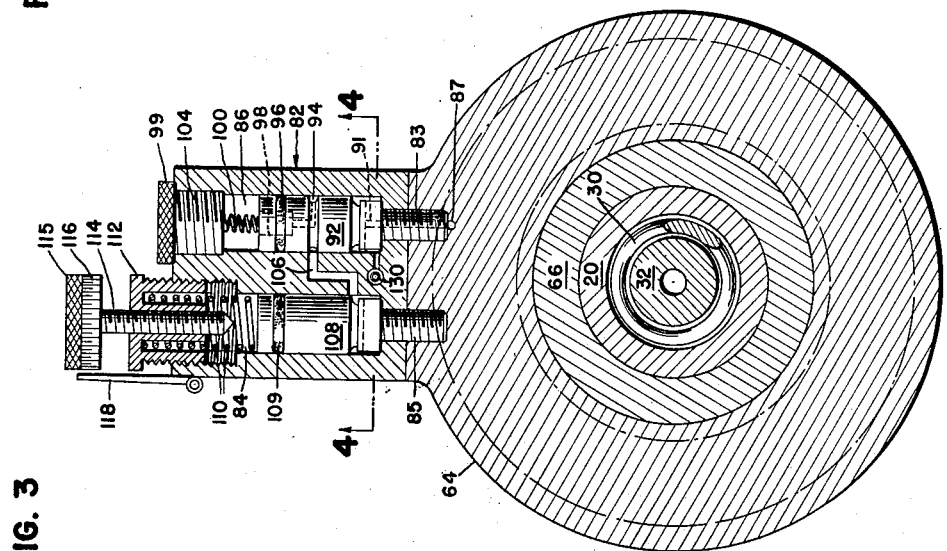
FIG. 3
INVENTOR
LUTHER E. LEE
BY
ATTORNEYS June 9, 1959
L. E. LEE
2,889,754
MACHINE TOOL
Filed March 1, 1954
5 Sheets-Sheet 4
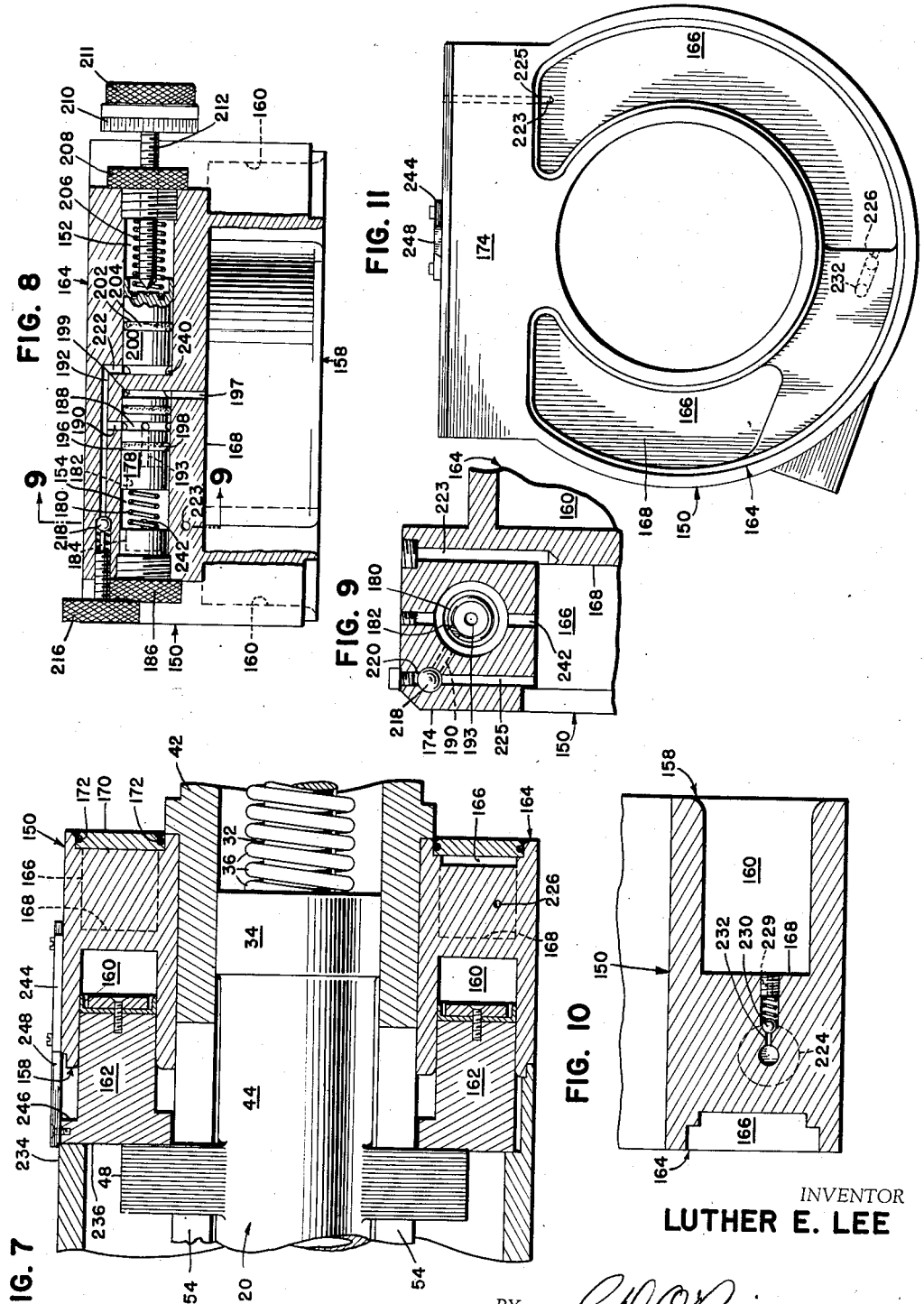
INVENTOR
LUTHER E. LEE June 9, 1959

L. E. LEE 2,889,754

MACHINE TOOL

Filed March 1, 1954

INVENTOR
LUTHER E. LEE

BY

ATTORNEYS

United States Patent Office 2,889,754
Patented June 9, 1959

2,889,754

MACHINE TOOL

Luther E. Lee, Takoma Park, Md.

Application March 1, 1954, Serial No. 413,487

3 Claims. (Cl. 90—16)

(Granted under Title 35, U.S. Code (1952), sec. 266)

The invention described herein may be manufactured and used by or for the Government of the United States of America for governmental purposes without the payment of any royalties thereon or therefor.

This invention relates to machine tools and more particularly to a toolholding head in which an indexing mechanism will permit a cutting tool to advance automatically into a workpiece in preselected increments.

This application is a continuation-in-part of my copending patent application Serial No. 405,267, filed January 20, 1954, for Machine Tool.

The present invention contemplates the use of a compact self-contained hydraulically operated indexing mechanism capable of accurately and automatically controlling the advancing movement of a cutting tool into a workpiece during machine tool operation. Previously, indexing mechanisms employed with a power operated tool, such as is described in my issued Patent No. 2,641,-151 or similar devices for this purpose, have been of the ratchet and pawl type which operates by rotating a suitable space block carrying collar to provide for the requisite tool advance.

Therefore, it is an object of the present invention to provide a fluid controlled means for accurately regulating tool movement.

A further object of this invention is to provide a power operated toolholder with means for automatically and accurately controlling the advance of a cutting tool in predetermined successive increments.

Another object of this invention is to provide a novel compact hydraulic indexing mechanism suitable for combination with a machine tool to control the movement of a cutting tool into a workpiece in preselected increments.

Still another object of this invention is to provide a self-contained hydraulic indexing mechanism capable of accurately controlling the movement of a cutting element in predetermined increments.

A further object of this invention is to provide a power operated toolholder to be used in combination with a lathe with an indexing attachment for automatically controlling tool movement during the cutting operation.

An additional object of this invention is to provide a simple inexpensive hydraulic system for automatically and accurately controlling the advance of a machine element in successive increments.

A further object is to provide an adjustable hydraulic limit stop.

Other objects and many of the attendant advantages of this invention will be readily appreciated as the same becomes better understood by reference to the following detailed description when considered in connection with the accompanying drawings wherein:

Fig. 1 is a top plan view of a power operated toolholder embodying the present invention;

Fig. 2 is an enlarged side elevation partially in vertical section showing a power operated toolholder and hydraulic indexing mechanism taken along a line substantially corresponding to line 2—2 of Fig. 1;

Fig. 3 is a transverse vertical sectional view taken along a line substantially corresponding to line 3—3 of Fig. 2;

Fig. 4 is an enlarged sectional view looking upwardly taken substantially along the plane of line 4—4 of Fig. 3;

Fig. 5 is a diagrammatic illustration of the hydraulic indexing system of the present invention.

Fig. 6 is an elevational view, partially in section, of one side of a modified form of the present invention;

Fig. 7 is a longitudinal sectional view of a portion of the power operated toolholder shown in combination with the indexing mechanism of Fig. 6;

Fig. 8 is a sectional plan view of the modified form of the indexing mechanism;

Fig. 9 is a sectional view taken substantially along the plane of line 9—9 of Fig. 8;

Fig. 10 is a sectional view taken substantially along the plane of line 10—10 of Fig. 6;

Fig. 11 is an elevational view of the opposite side of the modified form of the indexing mechanism shown in Figs. 6 to 10;

Figure 12:
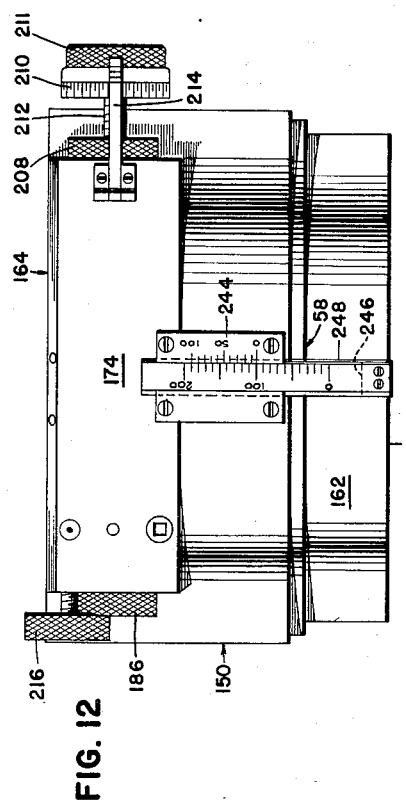
Fig. 12 is a top plan view of the modified form of indexing mechanism shown in Figs. 6 to 11.

Referring to the drawings and particularly to Fig. 1 there is illustrated a power operated toolholder 10 employing a self-contained hydraulic mechanism 12 which will automatically control the movement of a cutting tool 14 during machine operation. Although the present invention, as shown, is applied to a power operated toolholder to advance a cutting tool bit which is commonly used in turning or chasing operations on a machine lathe, it is within the contemplation of this invention that the mechanism described may be employed with millers, planers, slotters, or the like wherein accurately controlled tool advance or measurement is required during the machining operations.

As illustrated in Figs. 1 and 2 the power operated toolholder 10, also referred to as a turning and chasing head, operates automatically to advance a cutting tool 14 into a workpiece as set forth in my issued patent and pending patent application aforesaid. Broadly, it comprises a housing 16 having a fluid receiving chamber 18 for receiving an actuating pressure fluid from an external source through the line 19 and control valve 21. The chamber 18 transmits the actuating fluid pressure to a piston and ram assembly 20 to advance the tool bit 14 supported by the tool bracket 22 into a workpiece. By suitably positioning an indexing mechanism 12 in the path of the piston and ram assembly 20 the advancing movement of the cutting tool 14 may be accurately controlled in successive cutting strokes as the piston and ram assembly 20 is forced with the cutting tool 14 into the workpiece by the fluid pressure in the chamber 18.

A mounting bracket 24 having spaced carriage mounting holes 26 is suitably machined to carry the forward end of the ram 28 of the movable piston assembly for reciprocating movement. A keyway or other suitable mechanical equivalent, not shown, may be provided to present rotation of the piston and ram assembly 20. The distal end of the ram is provided with a tool bracket 22 mounting a coolant supply nozzle 30 which directs coolant onto the cutting tool bit 14 that is also supported by the tool bracket 22. Extending rearwardly from the ram and firmly fastened thereto is a piston shaft 32 (Fig. 2) which is secured to a reciprocable piston 44 having a guide portion 34. A spring 36 encircles this piston shaft and normally urges the ram rearwardly. Forward movement of the spring 36 is limited by washer 38 that bottoms against the shoulder 40 on the bushing 42. The piston 44 may be provided with one or more piston rings 46, as desired. Radially extending from the piston 44 at a position intermediate its length are oppositely projecting lugs 48 which serve as suitable limit strikes for engaging against an axially movable limit stop flange 50.

The housing 16 of the turning and chasing head connects to a tubular section 52 having a forward guide bushing 42 which bushing is supported by threaded engagement with the rearward portion of the mounting bracket 24. Elongated slots 54 are provided in the section 52 to receive reciprocating lugs 48 during axial movement of the piston and ram assembly 20. The forward end of the bushing 42 has a shoulder 40 which will support the recessed washer 38 and will provide a stop member for the forward end of the spring 36. Therefore, spring 36 is supported between the piston 44 and washer 38 and will constantly urge the piston and ram assembly 20 rearwardly to retract the ram 28 with the cutting tool bit 14 thereon.

A calibrated dial 56 is in threaded engagement with the rear section of the housing 16 and cooperates with suitable indicating means such as the hinged pointer 58 to provide a ready means for determining the extent of tool retraction. Projecting laterally from the housing 16 is a control valve 21 which may be employed to regulate the flow of actuating fluid pressure medium into the housing chamber 18 which fluid will advance the piston and ram assembly 20 into the operating position; one embodiment of this type of valve is described in my copending patent application Serial No. 405,267. A removable cylindrical cover member 60 encloses the intermediate portion of the toolholder and protects the operating mechanism from foreign matter. Ready access to the indexing mechanism or the interior of the power operated toolholder is provided by merely disengaging the lock nut 62 in order to slide the cylindrical cover member 60 rearwardly thereby exposing the interior of the toolholder.

The indexing mechanism 12 or limit stop for controlling the movement of the lugs 48, best illustrated in Fig. 2, comprises an annular sleeve 64 that encircles the tubular rear section of the guide bushing 42 of the piston and ram assembly 20. The annular sleeve 64 is forced against the radial abutment 66 on the guide bushing 42 and is held in position on the bushing by a setscrew or other suitable fastening means, not shown. The rear face 68 of the sleeve 64 is provided with a deep annular groove or ring type cylinder 70 in which an elongated toroidal piston 72, shown as being integral with the circular stop flange 50, will be slidably retained. The head of the piston 72 is provided with a retaining ring 76 of Teflon, or other suitable fluid retaining material, fastened to the piston head to prevent fluid seepage from the cylinder 70 during piston movement. Separation or parting of the hollow cylinder or toroidal piston 72 from the ring cylinder 70 is prevented by the setscrew 78 retained by the cover member 60 and sleeve 64 which engages the end of the longitudinal keyway 80 formed on the periphery of the piston 72.

The control housing 82 for the indexing mechanism, best illustrated in Figs. 2, 3 and 4, is rigidly fastened to the top of the annular sleeve 64 by means of the bolts 83, 85, and is provided with a fluid control cylinder 84, an intermediate fluid receiving cylinder 86, a fluid pumping cylinder 88, and a fluid storage chamber or reservoir 90. The intermediate fluid receiving cylinder 86 communicates directly with the ring cylinder 70 through the passageway 87 formed in the sleeve 64 and passes through the hollow bolt 83. A plunger 92 having a circumferential groove 94 thereon that interconnects with axial passageway 102 which leads into the top portion of the cylinder 86, an O-ring seal 96 spaced from the groove 94, and an end recess 98 in the plunger to retain one end of a spring 100, is slidably movable within the intermediate fluid receiving cylinder. Plug 99 seals the end of cylinder 86 and also serves as an abutment for the spring 100 which spring will normally urge the plunger 92 into the downward or closed position as shown in Figs. 3 and 5 to prevent fluid from entering the cylinder 86. It will be noted that the axial passageway 102 drilled in the rear of the plunger 92 communicates with the groove 94 and is capable of transmitting fluid through the plunger from the circumferential groove 94 to within the spring retaining recess 98 in the end of the plunger 92. Therefore, fluid will be permitted to flow from adjacent the groove 94 through the passageway 102 and recess 98 to a drain port 104 and passage 142 that leads to the fluid storage chamber 90 in the housing body 82.

The fluid control cylinder 84 is laterally spaced from the intermediate fluid cylinder 86 and interconnected therewith by passageway 106. A plunger 108 with a suitable seal 109 thereon is slidable in cylinder 84 and is normally urged to discharge fluid from the cylinder by the spring 110 which is guided in the cylinder by the recessed end plug 112. Plunger displacement within the cylinder 84 is controlled accurately by a fluid volume control dial 115 having a stem 114 that is in threaded engagement with the plug 112. By providing suitable indicia 116 on the dial 115 to be used in conjunction with the hinged pointer 118 the displacement of the plunger 108 may be adjusted to obtain the desired volume in the cylinder 84. Thus by correlating the volumetric displacement of the plunger 108 with the forward increment advance of the cutting tool an accurate control of tool movement will be obtained. That is, for each given increment of tool advance there is a corresponding volume increment of fluid to be displaced from within the sleeve cylinder 70 and it is this increment that will be controlled by the displacement of plunger 108.

A hand operated piston pump assembly 120 is slidably retained within the pumping cylinder 88 and in operation is capable of providing sufficient suction to overcome the action of check valve 122 to draw fluid into the cylinder 88 from the storage chamber 90 through passageway 126 in the bridge wall 128 located at the bottom of the storage chamber 90. Upon downward movement of the pump assembly 120 fluid is forced through the check valve 130 into the intermediate cylinder 86, and against the resistance of spring 100 the fluid will be pumped into the sleeve cylinder 70 through passageway 87 to move the piston 72 rearwardly.

Removable cover member 132 encloses the top of the fluid storage chamber 90 and is retained on the housing 82 by suitable fastening means 134. Clean out plugs 136, 138 are provided adjacent the check valve 122, 130, respectively, to facilitate cleaning and drainage of the housing 82.

A hollow screw 140 is tapped into the passageway 87 in the annular sleeve 64 to vent the cylinder 70, when required, and it is within the contemplation of this invention to interconnect the vent with the storage chamber 90 so that fluid may be drained directly into the storage chamber.

One method of operation for the indexing mechanism may be described more clearly by referring to the diagrammatic illustration of Fig. 5, which has reference characters similar to the other figures, and to Fig. 2. In the initial setup the dial knob 56 is rotated to advance the piston and ram assembly 20 and force the fluid from the sleeve cylinder 70 so that the cutting tool 14 is oriented with respect to the workpiece assuming the position of the tool for the final cutting stroke. The knob 56 is then backed off to permit the tool 14 to be retracted sufficiently to clear the workpiece. By reciprocating the hand pump mechanism 120 fluid is withdrawn from storage chamber 90 through check valve 122 and drawn into pump cylinder 88. Downward displacement of the pump mechanism will discharge fluid through check valve 130 and through cylinder 86 and passage 87 into the chamber 70. While filling the main cylinder 70 the control cylinder 84 may be closed off if desired by placing the end of the dial stem 114 in cylinder 84 against the plunger 108 to restrict movement thereof. Having supplied sufficient fluid into the cylinder 70, the piston 72 will be moved rearwardly and in turn the cutting tool 14 will be retracted from the workpiece. The dial stem 114 from the plunger 108 may then be retracted for a distance sufficient to give the desired depth of cut on the workpiece as indicated by the indicia on the dial 115. Actuating fluid may then be admitted through the control valve 21 into chamber 18 to act against the piston 44 and the lugs 48 will move forward against the rear face 50 of the piston 72 with sufficient force to overcome spring 100 behind plunger 92. A supply of fluid from the cylinder 70 will be forced into cylinder 86 displacing plunger 92 and opening the line 106 to control cylinder 84 to admit an accurately controlled volume of fluid. With actuating fluid pressure in the chamber 18 a cutting stroke may be made with the cutting tool 14 projected forward to an advanced position. As the cutting stroke is completed the chamber pressure will be released, as described in my prior patent application, and the strength of springs 100 and 110 in the mechanism 12 is such that spring 100 will force plunger 92 closed before spring 110 acts to return plunger 108. Once plunger 92 is seated against the bottom of the cylinder 86, as illustrated in Fig. 5, the groove 94 will communicate with passage 106 in order to allow fluid entrapped in the control cylinder 84 to flow through the passage 106 into the groove 94 and out through passage 102 into the rear portion of cylinder 86. Upon continued operation as fluid fills the rear of cylinder 86 excess fluid will be pumped by the reciprocation of plunger 92 into the chamber 90 through port 104 and line 142. As the power operated toolholder is reoriented to the starting position to start another cutting stroke, actuating fluid will again be admitted to the chamber 18 to repeat the cycle of operations. It will be apparent that upon repetition of the above cycle of operations the machine tool cutter bit 14 will be advanced in successive equal increments however, the depth of each cut may be changed for each cutting stroke of the tool merely by adjusting the dial 115. Once the fluid is pumped from the cylinder 70 no further tool advancement will occur and, in automatic operation, no harm will be done if the machine continues to function.

Fluid entrained in the intermediate cylinder 86 of control valve 12 will force the machine tool operating piston 44 rearwardly a fixed distance each time pressure in chamber 18 is relieved. When lugs 48 are again advanced a cushioning effect may be provided as this increment or volume of fluid is initially forced back into the intermediate cylinder 86. After this cushioning increment is absorbed the true cutting increment is provided by forcing additional fluid into the control cylinder 84. This cushioning effect or piston return may be minimized by reducing the offset in the passage 106 between cylinders 84 and 86.

A modified embodiment of the present invention is illustrated in Figs. 6 to 13 wherein the sleeve housing 150 has been designed as an integral unit to include the fluid control and intermediate cylinders 152, 154 respectively, a fluid storage chamber 166, and a pump mechanism 156. The sleeve housing 150 is bored centrally to encircle the guide bushing 42 similar to that illustrated in Fig. 2 when the indexing mechanism is used in combination with the power operated toolholder illustrated. One surface 158 of the housing 150 is recessed to provide an annular cylinder 160 which will receive the toroidal piston 162 that is similar to the piston illustrated in Fig. 2. The opposite surface 164 of the housing 150 is recessed sufficiently so that a fluid storage chamber 166 will be formed within the housing 150 and will be separated from the annular cylinder 160 by the wall 168 intermediate the width of the housing. A cover plate member 170 having sealing rings 172 encloses the rear side of the storage chamber 166 to prevent fluid loss.

Figure 13:
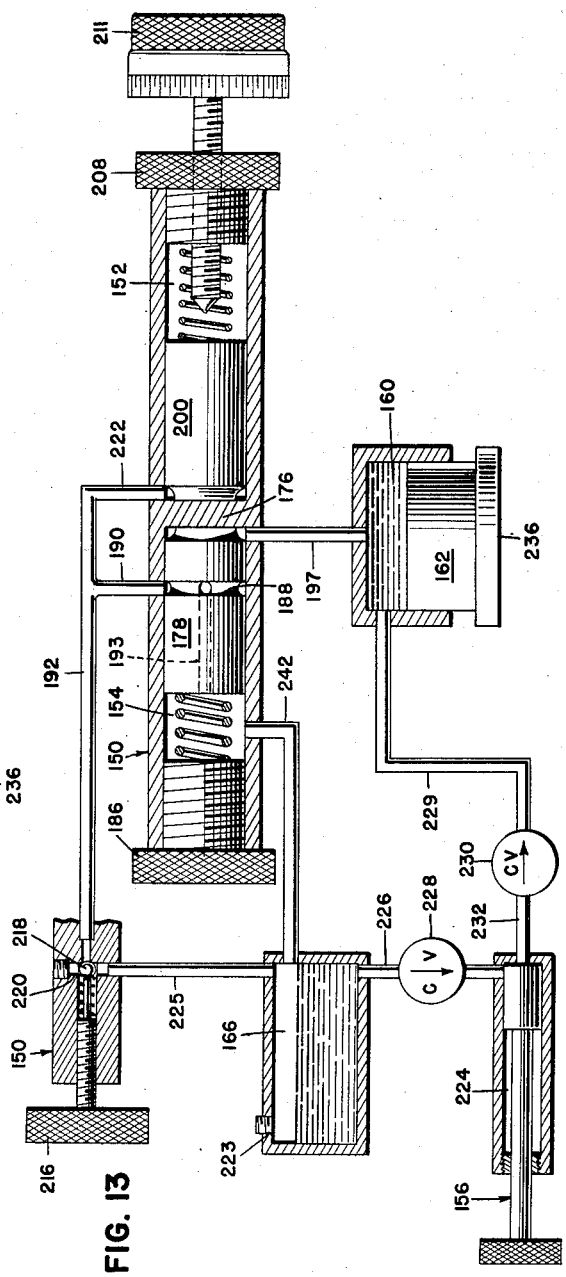
Fig. 13 is a diagrammatic illustration of the hydraulic system of the modified form of indexing device illustrated in Figs. 6 to 12.

An upstanding boss 174 on the housing 150 is bored to provide an intermediate cylinder 154 and a control cylinder 152 and the cylinders are separated from each other by wall 176. Piston 178 slidably retained in the intermediate cylinder 150 is normally urged against the wall 176 by the spring 180 that is guidingly supported between suitable recesses 182, 184 in the plunger 178 and end plug 186, respectively. The intermediate cylinder 154 is connected to the fluid control cylinder 152 through passage 190, 192, 222 so that when the intermediate cylinder plunger 178 is seated against wall 176 as shown in Figs. 8 and 13, circumferential groove 188 registers with passage 190 to port fluid to the reservoir 166 through the dotted line axial passage 193 and thence through passage 242. Another circumferential groove 196 in piston 178 receives an O-ring seal 198 to control fluid seepage around the plunger 178, while the chamfered plunger end 199 will permit fluid to enter the cylinder 154 from annular cylinder 160 through passageway 197.

The control cylinder 152 is also provided with a plunger 200 having a circumferential groove 202 for receiving an O-ring seal 204. Spring 206 is guidingly supported by the recess in plunger 200 and the end plug 208 and normally urges the plunger 200 against the wall 176 to a closed cylinder position. Threadedly engaging the plug 200 is a graduated sleeve dial 210 on the knob 211 which has an elongated stem 212 that protrudes into the control cylinder 152 to regulate accurately the displacement of the plunger 200. Suitable indicating means such as a graduated pivoted pointer 214, as shown in Fig. 6, cooperates with the sleeve dial 210 to indicate the relative position of the plunger 200 in the cylinder. Thus, there is provided a means for measuring the tool movement as correlated to the control cylinder volume, as previously discussed.

An elongated passageway 192 is drilled in the boss 174 adjacent the cylinder 154 and end tapped to receive the air vent screw 216 for venting or draining the cylinders 152, 154 and storage chamber 166. A spring urged check valve 218 is provided in the passageway 192 to normally close the vent port 220 leading from the passageway 192 into the atmosphere. Extending below the vent port 220 is a spillway passage 225 through which excess fluid from the annular cylinder 160 may be bled directly to the storage chamber 166 without passing through passageway 242 or cylinder 154. Passages 190 and 222 branching off from passageway 192 lead to the cylinders 154, 152, respectively, so that fluid may be transmitted from one cylinder to the other as described above. For initially filling the storage chamber 166 a supply passageway 223 is provided which enters the storage chamber 166 as shown in Fig. 9.

Hydraulic fluid from within the storage chamber 166 on one face 164 of the housing 150 is pumped to the cylinder 160 on the opposite face 158 by the pumping mechanism 156 which is slidable within the cylinder 224 in the sleeve housing. An inlet port 226 with a spring urged check valve 228 will admit fluid into the pump cylinder 224 as the pump mechanism 156 is partially withdrawn manually in an outward stroke of the pump mechanism 156. As the pumping mechanism 156 is reciprocated to discharge the fluid into the annular cylinder 160 the check valve 228 will be closed and the fluid under pressure will pass through passage 232 to open the spring operated check valve 230 and fluid will flow into the annular cylinder 160 through passageway 229.

In order to avoid separation of the piston 162 from the cylinder 160 the cover member 234 of the power operated toolholder (Fig. 7) is mounted to provide a rearward limit stop against which the back face 236 of the piston 162 will strike to limit rearward movement of the piston 162.

Since the operation of the modified embodiment is quite similar to the first described form of the present invention the following description will broadly cover the present modified embodiment. Having made the requisite setup adjustments for the desired depth of cut by the cutting tool, fluid from the reservoir 166 is pumped into the annular cylinder 160 by reciprocating the pumping mechanism 156. When sufficient fluid is pumped into the cylinder 160 the vent screw 216 is released sufficiently to vent any air that may be entrained in the device. As the actuating fluid is admitted into the power operated toolholder chamber 18 (Fig. 2) the piston and ram assembly 20 will move outwardly in order to force the lugs 48 against the face 236 of the piston 162. Fluid under pressure from within the sleeve cylinder 160 will be forced to flow through the passageway 197 into the cavity formed by the chamfered plunger end 199 in the intermediate cylinder to displace plunger 178. As the plunger 178 is shifted within the cylinder 154 the port 190 will be uncovered and fluid will then flow through passageway 192 into annular cavity 240 formed by the chamfered end of plunger 200 in the control cylinder 152 to displace the plunger 200 a predetermined distance according to the position of the dial stem 212. As soon as the pressure from the actuating fluid is relieved, the spring action against the plunger 178 will force the residue of the fluid in the intermediate cylinder 154 back into the annular cylinder 160. When the plunger 178 is seated against the wall 176 the spring action behind plunger 200 will urge it to pump fluid from the cylinder 152 into the passageway 192 and then into the port 190 which now communicates with the circumferential groove 188 on the intermediate cylinder plunger 178. Fluid entering the groove 188 will flow through the passageway 193 into the spring recess 182 and to the back side of the cylinder 154. Upon a subsequent cycle the plunger 178 will be forced outwardly and fluid within the back side of the cylinder 154 will be forced or pumped through the port 242 in the cylinder side wall which leads into the storage chamber 166. The cycle may be repeated for each cutting stroke as previously described until the piston forces all the fluid from the annular cylinder 160.

In order to indicate directly the position or increment of movement of the piston 162 within the annular cylinder 160 a suitably calibrated vernier scale 244 is mounted on the top of the stationary annular housing 150, as shown in Figs. 6, 7, 11 and 12. A portion of the cover member 234 may be cut away to provide access to the rule mounting bracket 246 that is affixed to the movable piston 162. By attaching a graduated sliding rule 248 which will be free to slide along the vernier scale 244, to the mounting bracket 246 relative movement between the piston 162 and the cylinder 160 may accurately be determined. Thus, it will be readily apparent that any change in position of the sliding rule 244 will indicate the movement of the cutting tool.

Obviously many modifications and variations of the present invention are possible in the light of the above teachings. It is therefore to be understood that within the scope of the appended claims the invention may be practiced otherwise than as specifically described.

What is claimed is:

1. A pneumo-hydraulically operable cutter holding head for supporting a cutter on a machine tool comprising; a housing, a cutter support mounted in said housing for reciprocation between extended and retracted positions, means for supplying fluid pressure to said housing to move the cutter support to an extended position, resilient means for urging the cutter support to the retracted position, yieldable hydraulic stop means to limit the extent of forward movement of the cutter support in each successive extended movement, and means to control the extent of the movement of the hydraulic stop means, said stop control means comprising a housing having a plurality of control cylinders therein, a first such cylinder having a spring urged plunger displaceable in the cylinder as fluid is displaced from said hydraulic stop means into said cylinder, a second cylinder communicating with said first cylinder and having a spring urged plunger adjustable within the cylinder to control the quantity of fluid admitted therein, and means having indicia thereon for indicating the displacement of the plunger in said second cylinder, and a chamber communicating with the second cylinder for receiving the fluid subsequently discharged from said control cylinders.

2. For use with a machine tool having a cutting tool advanceable in increments, an indexing mechanism comprising; a housing having a main cylinder in one side and a fluid storage chamber in the other side, said main cylinder having a piston slidable therein, fluid measuring means in said housing for receiving a fluid discharge from said cylinder, said fluid measuring means comprising an intermediate cylinder having a spring urged plunger with a fixed displacement, a control cylinder having a spring urged plunger with a variable control displacement, fluid passageways interconnecting said intermediate cylinder with said control cylinder and said fluid storage chamber with said intermediate cylinder whereby fluid from said main cylinder will be transmitted to said intermediate and control cylinders in sequences to control movement of said main cylinder piston.

3. For use with a machine tool having a cutting tool advanceable in increments, an indexing mechanism comprising; a housing having a main cylinder in one side and a fluid storage chamber in the other side, said main cylinder having a piston slidable therein, fluid measuring means in said housing for receiving a fluid discharged from said cylinder, said fluid measuring means comprising an intermediate cylinder having a spring urged plunger with a fixed displacement therein, a control cylinder having a spring urged plunger with a variable control displacement therein, fluid passageways interconnecting said intermedaite cylinder with said control cylinder and said fluid storage chamber with said intermediate cylinder, and pumping means for forcing a fluid from the storage chamber into the main cylinder to displace said main cylinder piston.

References Cited in the file of this patent

UNITED STATES PATENTS

| | | |
|---|---|---|
| 651,502 | Fitzgerald | June 12, 1900 |
| 1,950,039 | Smith et al. | Mar. 6, 1934 |
| 2,531,340 | Mathys | Nov. 21, 1950 |
| 2,570,592 | Price | Oct. 9, 1951 |
| 2,592,001 | Bereit | Apr. 8, 1952 |
| 2,613,703 | Calvert | Oct. 14, 1952 |
| 2,641,151 | Lee | June 9, 1953 |

FOREIGN PATENTS

| | | |
|---|---|---|
| 1,075,193 | France | Apr. 14, 1954 |